Figure 1:
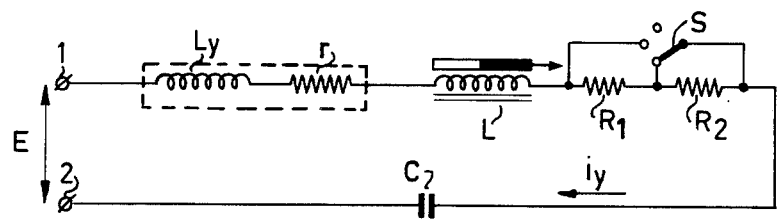

United States Patent [19]

Van der Vegt

[11] 3,962,603
[45] June 8, 1976

[54] CIRCUIT ARRANGEMENT IN TELEVISION DISPLAY APPARATUS FOR CORRECTING THE HORIZONTAL LINEARITY

[75] Inventor: Johannus Gerhardus Jozef Van der Vegt, Eindhoven, Netherlands

[73] Assignee: U.S. Philips Corporation, New York, N.Y.

[22] Filed: Jan. 20, 1975

[21] Appl. No.: 542,350

[30] Foreign Application Priority Data
Feb. 1, 1974 Netherlands.................... 7401402

[52] U.S. Cl................................. 315/370; 315/400
[51] Int. Cl.² ......................................... H01J 29/56
[58] Field of Search.................... 315/370, 399, 400

[56] References Cited
UNITED STATES PATENTS

| | | | |
|---|---|---|---|
| 3,566,181 | 2/1971 | Figlewicz | 315/400 X |
| 3,611,004 | 10/1971 | Smith | 315/370 X |
| 3,732,458 | 5/1973 | Wolber | 315/370 X |

*Primary Examiner*—T.H. Tubbesing
*Attorney, Agent, or Firm*—Frank R. Trifari; Henry I. Steckler

[57] ABSTRACT

A circuit arrangement in television display apparatus for correcting the horizontal linearity in which a network, for example, a resistor is arranged in series with the correction inductor. This makes it possible to correct the linearity throughout the trace time, which is necessary, for example, in the absence of a centring circuit.

5 Claims, 8 Drawing Figures

CIRCUIT ARRANGEMENT IN TELEVISION DISPLAY APPARATUS FOR CORRECTING THE HORIZONTAL LINEARITY

The invention relates to a circuit arrangement in television display apparatus for correcting the (horizontal) linearity of the deflection current flowing through a line deflection coil which forms part of a series arrangement including a correction inductor having a premagnetized core across which series arrangement a substantially constant voltage is present during the deflection interval.

In such a circuit arrangement the resistance of the deflection coil causes a linearity error of the deflection current because this current is not linear, but has a gradually decreasing differential coefficient. The so-called S correction being left out of consideration for the sake of simplicity, the expression for the said coefficient is $$\frac{di_y}{dt} = \frac{E - i_y r}{L_y}$$

where $L_y$ is the inductance and $r$ is the resistive value of the coil, and where $i_y$ is the deflection current caused by the applied voltage $E$.

This error may be corrected in known manner by means of an inductor having a premagnetized core which is in series with the deflection coil and behaves as a negative resistor. The premagnetization polarity is chosen to be such that it is eliminated by the deflection current at the initiation of the deflection interval so that the inductance of the correction inductor is at a maximum. Such a voltage is produced across this inductor that the differential coefficient of the deflection current at the initiation of the deflection interval is reduced to the same value as at the end thereof. During this interval the core is gradually saturated so that the inductance of and the voltage drop across the correction inductor decrease. The initial inductance can be adjusted to allow for differences in the resistive value of the deflection coil due to tolerances. Consequently, the inductance is of course also adjusted elsewhere in the interval, be it though with a certain approximation, but not at the end of the interval where it can hardly be varied due to the saturation state of the core.

There are cases in which an adjusting possibility at the end of the deflection interval is desirable so that a second degree of freedom in the correction of the linearity is obtained. Such is the case when there is no centring circuit. A direct current is added to the deflection current by means of a centring circuit so as to cause the landing spots of the electron beam on the screen of the television display tube when there is no line deflection to coincide with the geometrical central vertical line of the screen. The said circuit generally comprises diodes, windings, capacitors having a high capacitance and potentiometers, and it is therefore rather expensive. Moreover, a quite considerable current supplied by the line output stage flows through it, which results in a loss of power and an extra load for the line output transistor. The centring circuit may, however, be omitted when the display tube has a sufficiently accurate construction, for example, as regards the position of the electron gun with respect to the neck of the glass envelope. One construction turned out to have a maximum deviation of 5 mm to the left or right on a screen having a width of approximately 50 cm, i.e. a deviation of not more than approximately 2%. Since the deflection generally extends slightly beyond the screen, such a centring error is hardly visible, but it does result in a linearity error.

Actually the deflection current is not linear during the deflection interval, but it is S-corrected so that the non-constant scan rate on the screen due to the non-constant beam between the deflection centre and the almost flat screen is corrected. The obtained S shape of the current must be symmetrical relative to the value corresponding to the centre of the screen. If there is a centring deviation and if there is no centring circuit, the result will be an asymmetry of the S shape which, generally, cannot be eliminated. In fact, the linearity correction has substantially no effect at the end of the deflection interval, i.e. on the right-hand side of the screen.

This effect may be explained as follows. The required shape of the deflection current is obtained by means of three adjusting possibilities, to wit the capacitance of the S capacitor, the centring circuit and the linearity inductor. Now that one of these possibilities is absent, there is a need for a new degree of freedom. Adjustment of the said capacitance would be complicated and, moreover, it would affect the amplitude of the deflection current. It is therefore better to provide the deflection circuit with a linearity-adjusting facility which is also effective at the end of the deflection interval.

Another reason is the following. If there is a centring deviation, part of the video information falls beyond the screen. It is possible to make this part visible again, for example, by means of a phase adjustment of the line synchronizing circuit, but then it is accompanied by the said linearity error. When the displayed picture exhibits the same detail on the right and left edges of the screen, this error will be immediately noticeable, which is the case when displaying, for example, a checkered test picture or captioned pictures.

The absence of the centring circuit is not the only case where a linearity correction in the entire deflection interval is desirable. This may also be the case when due to tolerances the spread in the value of the resistance in the deflection circuit is fairly large. It is an object of the invention to make such a correction possible and to this end the circuit arrangement according to the invention is characterized in that the series arrangement also includes a network across which a voltage being a substantially linear function of time is present during the deflection interval.

Due to the step according to the invention a substantially linear voltage is thus added to the voltage prevailing across the linearity inductor. Since the deflection current is approximately linear, the circuit arrangement according to the invention may be characterized in that the network is a resistor. In this connection it is to be noted that a linearity correction is necessary because the deflection coil has an unwanted resistance, whereas the linearity is actually improved by means of an additional resistor.

The invention will be described in greater detail by way of example with reference to the following Figures.

Figure 2:
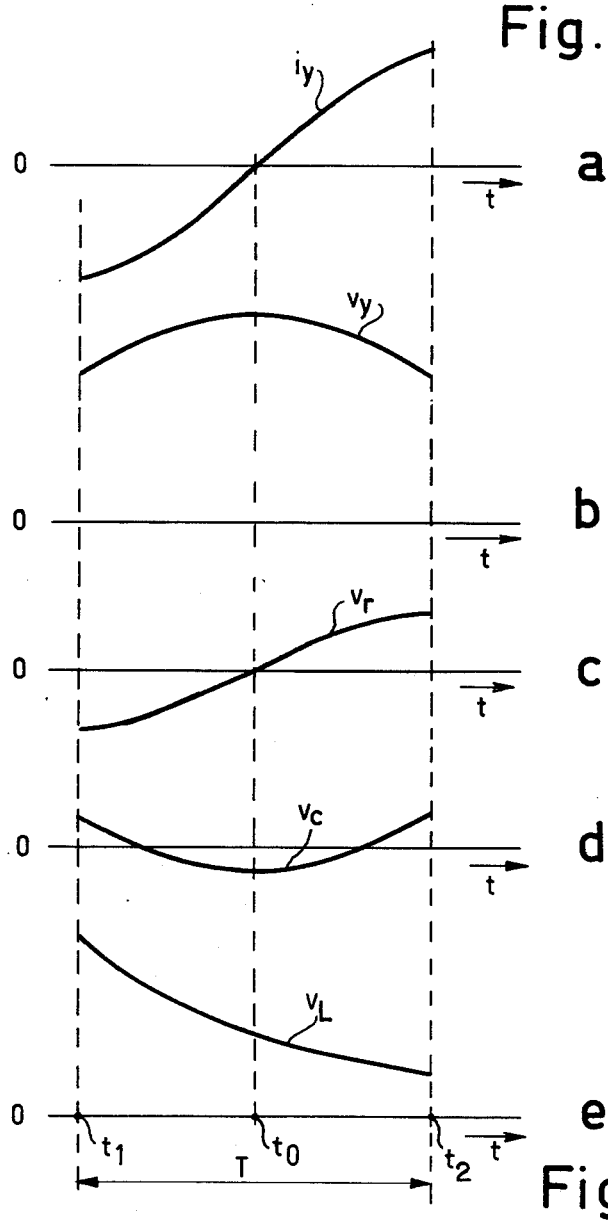
Figure 3:
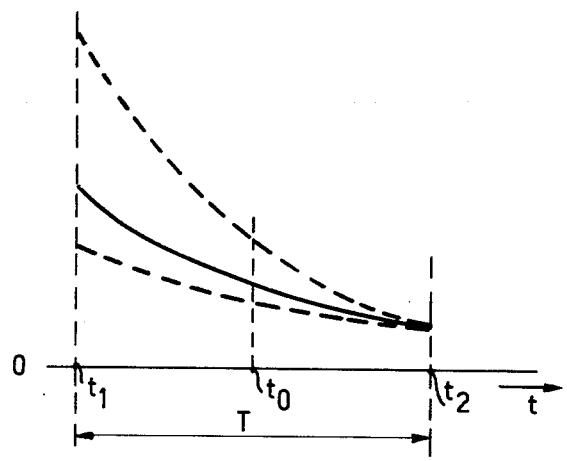
Figure 4:
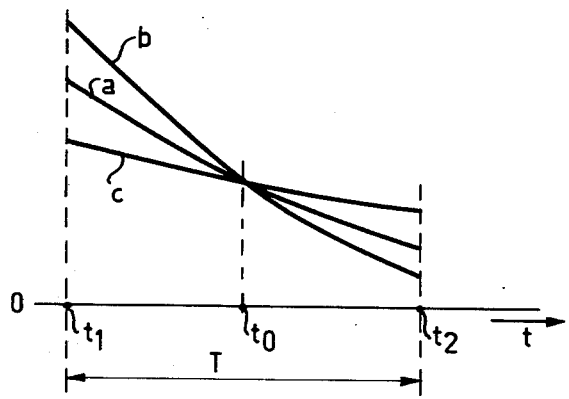

FIG. 1 shows a simplified principle circuit diagram of a circuit arrangement according to the invention, FIG. 2a, b, c and d show waveforms occurring in the circuit arrangement of FIG. 1, FIGS. 2e and 3 show waveforms occurring if the step according to the invention is not used, and FIG. 4 shows waveforms occurring if the step according to the invention is used.

FIG. 1 shows the simplified circuit diagram of the line deflection circuit in a television display apparatus (not shown). The circuit comprises in series a line deflection coil, a linearity control L and a capacitor C for the S correction. The deflection coil, which may consist in known manner of two or more coil sections, may be represented as the series network of an inductor Ly and a resistor r, while control L is an inductor with a premagnetization by means of a permanent magnet. According to the invention two resistors $R_1$ and $R_2$ of equal value R (R is approximately 0.5Ω at $r \approx 5\Omega$) are incorporated in series with the deflection coil, inductor L and capacitor C. By means of a switch S in a first position resistor $R_2$ can be short-circuited. In a second position the series arrangement of both resistors is short-circuited, while in a third position the switch remains open.

Elements Ly, r, L, $R_1$, $R_2$ and C are arranged in series between two terminals 1 and 2. During the deflection interval (the trace time) a substantially constant direct voltage E prevails in known manner between these terminals, for example, because a switch constituted by the parallel arrangement of a transistor and a diode connects the series arrangement of FIG. 1 to a direct voltage source. The deflection current $i_y$ having the S shape shown in FIG. 2a during the trace time T flows through the series arrangement. The situation during the retrace time is unimportant in this description and is therefore left out of consideration.

FIGS. 2b, 2c and 2d show the variation during the time T of the voltages $v_y$ across inductor $L_y$, $v_r$ across resistor r and $v_c$ across capacitor C, where both FIG. 2b and FIG. 2d exhibit approximately a parabola. FIG. 2e shows the variation of the voltage $v_L$ across the inductor L for the known case where resistors $R_1$ and $R_2$ are absent. The premagnetization polarity is chosen to be such that it is eliminated by current $i_y$ at the initiation $t_1$ of time T so that the inductance of inductor L is then maximum. After instant $t_1$ its core is gradually saturated so that the inductance of and the voltage drop across the inductor decrease. At the end $t_2$ of time T voltage $v_L$ assumes its minimum value. The waveform of FIG. 2e may be derived from that of FIG. 2b, 2c and 2d because the sum of the four voltages shown must be equal to voltage E.

In FIG. 3 the solid line shows the waveform of FIG. 2e, while the two broken lines represent voltage $v_L$ at different premagnetization values. The value of voltage $v_L$ can be adjusted at instant $t_1$, but not at instant $t_2$ because the core of inductor L is saturated at instant $t_2$. FIG. 3 shows that the linearity can hardly be corrected in a certain period preceding instant $t_2$.

According to the invention resistors $R_1$ and $R_2$ and switch S are provided in order to be able to correct the linearity throughout the trace time for the reasons explained hereinbefore. In FIG. 1 switch S is in its first position with the resistor $R_2$ being short-circuited. Inductor L is then adjusted in such a manner that the linearity is corrected for the nominal case where no centring deviation occurs, i.e. the inductor L is given the value corresponding to the correction of the resistive value r + R. FIG. 4 shows the voltage drop during time T across the series arrangement L, $R_1$ (curve a). Since the voltage drop across resistor $R_1$ is approximately linear, the variation in FIG. 4 is the sum of that in FIG. 3 and of a linear function.

When during adjustment a centring deviation to the left is observed on the screen (as seen by the viewer), a linearity error occurs and the picture on the left-hand side of the screen is larger than that on the right-hand side under the same deflection angle. In fact, the picture on the left-hand side is farther remote from the perpendicular projection of the deflection centre on the screen than is the picture on the right-hand side. This means that the intensity of current $i_y$ at instant $t_1$ is too large. The error can be corrected by setting switch S in its third position in which the two resistors $R_1$ and $R_2$ are arranged in series with inductor L. Curve b in FIG. 4 represents the voltage drop across this series arrangement. Since this voltage drop is larger at instant $t_1$ than in the previous case, the voltage across inductor $L_y$ is lower, whereas this voltage is higher at instant $t_2$ so that the desired effect is achieved.

In a similar manner the linearity error caused by a centring deviation to the right is corrected by setting switch S in its second position in which the two resistors $R_1$ and $R_2$ are short-circuited. In FIG. 4 curve c shows the correction voltage which is then present across inductor L and which results in current $i_y$ being increased at instant $t_1$ and decreased at instant $t_2$. Since the voltage drop across resistor $R_1$ and resistors $R_1$ and $R_2$, respectively, is approximately zero in the middle $t_o$ of trace time T, curves a, b and c intersect approximately in the same point at this instant.

FIG. 4 clearly shows that the step according to the invention makes it possible to adjust the linearity over the entire width of the displayed picture. If the adjustment by means of a three-position switch and two resistors is too coarse, a variable resistor may of course be used so that curves located between curves b and c in FIG. 4 can be obtained as desired. Inductor L is then adjusted in the nominal condition, while the value of the resistor is half its maximum value.

It will be evident that the step according to the invention may be alternatively used by arranging a line-frequency sawtooth-shaped voltage source instead of resistors $R_1$ and $R_2$ in series with inductor L. It will also be evident that the invention can be used for any type of television display tube. It has been found in the circuit arrangement of FIG. 1 and a colour television display tube having three cathodes in one flat plane that the linearity error caused by the previously mentioned centring deviation of 5 mm can be maintained within 4%.

What is claimed is:

1. A circuit arrangement for correcting the linearity of the deflection current flowing through a line deflection coil, said circuit comprising a series arrangement means for coupling to said coil and including a correction inductor having a premagnetized core across which series arrangement a substantially constant voltage is present during the deflection interval, and a network means for providing a voltage which is a substantially linear function of time during the deflection interval.

2. A circuit arrangement as claimed in claim 1, wherein the network comprises a resistor.

3. A circuit arrangement as claimed in claim 2, wherein the value of the resistor is adjustable.

4. A circuit arrangement as claimed in claim 3, wherein the inductance of the correction inductor has a value selected in the absence of a horizontal centring deviation, and the value of the resistor is half the maximum value thereof.

5. A circuit arrangement as claimed in claim 1 further comprising said line deflection coil.

* * * * *